(12) United States Patent
Chalk et al.

(10) Patent No.: US 10,684,434 B2
(45) Date of Patent: Jun. 16, 2020

(54) FLEXIBLE OPTICAL FIBER RIBBON WITH INTERMITTENTLY BONDED POLYMER LAYERS

(71) Applicant: Corning Optical Communications LLC, Charlotte, NC (US)

(72) Inventors: Julie Ann Chalk, Hickory, NC (US); David Wesley Chiasson, Edmonton (CA); Barada Kanta Nayak, Painted Post, NY (US); Rebecca Elizabeth Sistare, Hickory, NC (US)

(73) Assignee: CORNING OPTICAL COMMUNICATIONS LLC, Charlotte, NC (US)

(*) Notice: Subject to any disclaimer, the term of this patent is extended or adjusted under 35 U.S.C. 154(b) by 0 days.

(21) Appl. No.: 16/543,221

(22) Filed: Aug. 16, 2019

(65) Prior Publication Data
US 2019/0369343 A1 Dec. 5, 2019

Related U.S. Application Data

(62) Division of application No. 15/670,141, filed on Aug. 7, 2017, now Pat. No. 10,409,017.
(Continued)

(51) Int. Cl.
*G02B 6/44* (2006.01)

(52) U.S. Cl.
CPC .......... *G02B 6/4403* (2013.01); *G02B 6/443* (2013.01); *G02B 6/4405* (2013.01); *G02B 6/4411* (2013.01)

(58) Field of Classification Search
CPC ..... G02B 6/4403; G02B 6/4411; G02B 6/443
See application file for complete search history.

(56) References Cited

U.S. PATENT DOCUMENTS

| 5,485,539 A | 1/1996 | Mills |
| 6,253,013 B1 | 6/2001 | Lochkovic et al. |
(Continued)

FOREIGN PATENT DOCUMENTS

| EP | 349206 A2 | 1/1990 |
| JP | 05291042 A | 11/1993 |
(Continued)

OTHER PUBLICATIONS

International Search Report and Written Opinion PCT/US2017/045674 dated Jan. 26, 2018.

*Primary Examiner* — Daniel Petkovsek
(74) *Attorney, Agent, or Firm* — William D. Doyle

(57) ABSTRACT

A flexible optical ribbon and associated systems and methods of manufacturing are provided. The ribbon includes a plurality of optical transmission elements and an inner layer comprising a cross-linked polymer material and an outer surface. The outer surface of the inner layer includes first areas having first concentrations of uncrosslinked polymer material and second areas having second concentrations of uncrosslinked polymer material. The first concentrations are greater than the second concentrations. The ribbon includes an outer polymer layer having an inner surface interfacing with the outer surface of the inner layer. The outer polymer layer has a higher level of bonding to the inner layer at the first areas than at the second areas due to the ability of the outer polymer material to bond or crosslink with the larger numbers of uncrosslinked polymer material in the first areas.

7 Claims, 5 Drawing Sheets

Related U.S. Application Data

(60) Provisional application No. 62/371,911, filed on Aug. 8, 2016.

(56) References Cited

U.S. PATENT DOCUMENTS

| | | | |
|---|---|---|---|
| 6,535,673 B1* | 3/2003 | Lochkovic | G02B 6/4404 385/114 |
| 8,787,718 B2 | 7/2014 | Tanabe et al. | |
| 9,086,555 B2* | 7/2015 | Namazue | G02B 6/44 |
| 9,880,368 B2 | 1/2018 | Debban et al. | |
| 9,989,723 B2 | 6/2018 | Hoshino et al. | |
| 10,101,549 B2* | 10/2018 | Hoshino | G02B 6/44 |
| 10,409,017 B2* | 9/2019 | Chiasson | G02B 6/4411 |
| 2002/0067900 A1 | 6/2002 | Mills et al. | |
| 2011/0110635 A1* | 5/2011 | Toge | G02B 6/4403 385/102 |
| 2013/0302003 A1 | 11/2013 | Bookbinder et al. | |
| 2014/0016905 A1 | 1/2014 | Tanabe et al. | |
| 2017/0219792 A1 | 8/2017 | Debban et al. | |
| 2018/0031792 A1 | 2/2018 | Risch et al. | |

FOREIGN PATENT DOCUMENTS

| | | |
|---|---|---|
| JP | 04980841 B2 | 7/2012 |
| JP | 2013257394 A | 12/2013 |
| JP | 2014038146 A | 2/2014 |

\* cited by examiner

FLEXIBLE OPTICAL FIBER RIBBON WITH INTERMITTENTLY BONDED POLYMER LAYERS

CROSS-REFERENCE TO RELATED APPLICATIONS

This application is a divisional of U.S. patent application Ser. No. 15/670,141, filed Aug. 7, 2017, now U.S. Pat. No. 10,409,017 B2, issued on Sep. 10, 2019. This application claims the benefit of priority under 35 U.S.C. § 119 of U.S. Application Ser. No. 62/371,911, filed Aug. 8, 2016, the content of which is relied upon and incorporated herein by reference in its entirety.

BACKGROUND

The disclosure relates generally to optical fibers and more particularly to optical fiber ribbons. Optical fibers have seen increased use in a wide variety of electronics and telecommunications fields. Optical fiber ribbons may hold multiple optical fibers together in a group or array. The optical fiber ribbon includes a body formed from a material that holds the optical fibers together and/or that provides structure that assists in the handling and connecting of the optical fibers of the ribbon to various components or devices.

SUMMARY

One embodiment of the disclosure relates to an optical fiber ribbon. The ribbon includes a plurality of optical transmission elements and an inner layer including a cross-linked polymer material and an outer surface. The inner layer surrounds the plurality of optical transmission elements. The outer surface of the inner layer includes first areas having first concentrations of uncrosslinked polymer material and second areas having second concentrations of uncrosslinked polymer material. The first concentrations of uncrosslinked polymer material are greater than the second concentrations of uncrosslinked polymer materials. The ribbon includes an outer polymer layer surrounding and supporting the plurality of optical transmission elements, and the outer polymer layer has an inner surface interfacing with the outer surface of the inner layer.

An additional embodiment of the disclosure relates to a flexible optical fiber ribbon. The ribbon includes a plurality of elongate optical fibers and an inner polymer coating layer surrounding the plurality of optical fibers. The inner polymer coating layer has an inner surface facing the optical fibers and an outer surface opposite the inner surface. The ribbon includes an outer ribbon body surrounding the inner polymer coating layer. The outer ribbon body has an inner surface facing the outer surface of the inner polymer coating layer. The inner surface of the ribbon body includes a plurality of first regions each having a first level of bonding to the outer surface of the inner polymer coating layer and a plurality of second regions each having a second level of bonding to the outer surface of the inner polymer coating layer. The first levels of bonding are greater than the second levels of bonding.

An additional embodiment of the disclosure relates to a method of forming a flexible optical ribbon. The method includes applying a first UV curable polymer material onto a plurality of optical fibers. The method includes curing the first UV curable polymer material around the plurality of optical fibers with UV light in the presence of oxygen such that a first layer of UV cured polymer is formed having an outer surface that is at least partially uncured due to the presence of oxygen, resulting in the presence of uncrosslinked UV curable polymer material at the outer surface. The method includes modifying portions of the outer surface to form modified areas having levels of uncrosslinked UV curable polymer material that are lower than the levels of uncrosslinked UV curable polymer material present on the outer surface outside of the modified areas. The method includes applying a second UV curable polymer material onto the outer surface of the first layer of UV cured polymer. The method includes curing the second UV curable polymer material around the plurality of optical fibers with UV light to form a second UV curable polymer layer.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
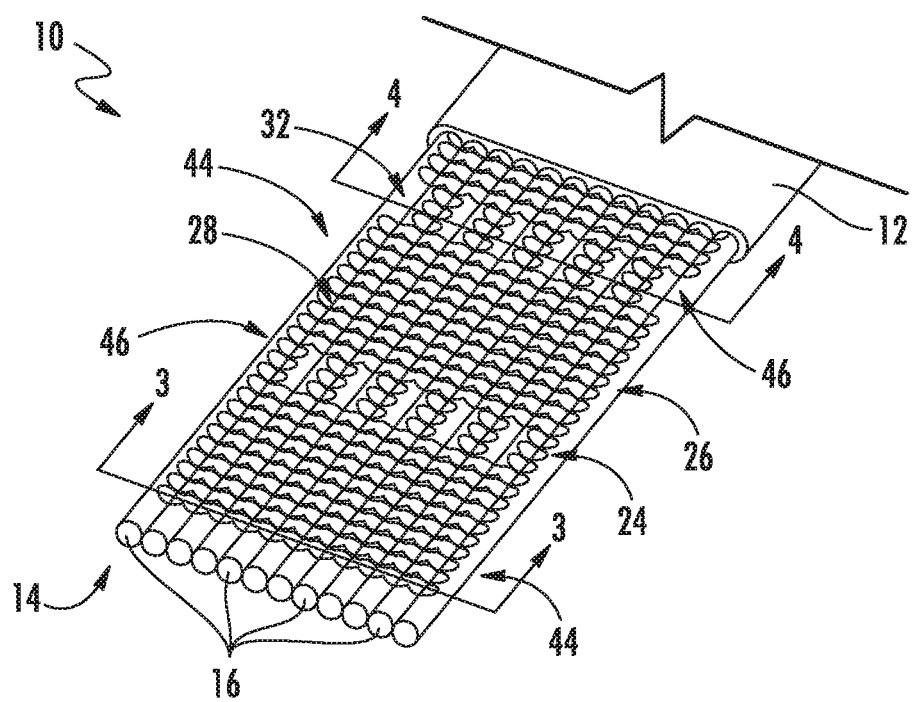
FIG. 1 shows a cut-away, perspective view of a flexible optical fiber ribbon, according to an exemplary embodiment.

Referring generally to the figures, various embodiments of an optical ribbon are shown. In general, the ribbon embodiments disclosed herein utilize an inventive design for controlling the level of bonding between adjacent polymer layers within a ribbon structure. As discussed in more detail below, the ribbon embodiments include regions of high levels of bonding and low levels of bonding between structures within the ribbon. For example, the ribbon may include differential levels of bonding between an inner polymer layer within the ribbon structure (e.g., a contiguous inner ribbon layer, the primary polymer coating layer of the ribbon optical fibers) and an outer polymer ribbon layer, and/or the ribbon may include differential levels of bonding between the primary coating layers of adjacent optical fibers within the ribbon.

In specific embodiments, the pattern of differential bonding is formed by creating regions of high concentrations of uncrosslinked polymer material (e.g., uncured acrylate monomers/oligomers) and regions of low or zero concentrations of uncrosslinked polymer material along the outer surface of the inner layer. Upon application and curing of the outer polymer, the polymer of the outer layer crosslinks with the uncrosslinked polymer material in the high concentration zones forming regions of high levels of bonding between the inner and outer polymer layers. In the zones having low or zero levels of uncrosslinked polymer material available for crosslinking, regions of negligible levels of bonding are formed between the inner and outer polymer ribbon layers. In a similar manner, bonding between adjacent primary fiber coating layers may also be controlled. Thus, in such embodiments, flexibility of the ribbon can be improved and controlled by controlling levels of cross-linking between inner and outer polymer layers of the ribbon and/or between adjacent optical fibers.

In specific embodiments, the concentration of uncrosslinked polymer material is controlled by forming an inner polymer layer from a UV curable polymer material that is cured around the optical fibers in the presence of oxygen. The oxygen inhibits crosslinking of the UV curable material in a thin zone (e.g. less than 2 μm) on the surface of the inner polymer layer which results in a high concentration of uncrosslinked material along the outer surface of the inner polymer layer(s). In specific embodiments, the whole inner polymer layer of the ribbon is cured under the same conditions such that the oxygen crosslinked inhibited zone occupies substantially the entire outer surface of the inner polymer layer(s). To form the differential zones of uncrosslinked material concentration, the outer surface of the inner layer(s) is modified.

In one exemplary embodiment, a pattern of a masking material is applied (e.g., via ink-jet application) to the outer surface of the UV curable polymer of the inner layer(s). In this embodiment, the masking material blocks or limits the ability of the outer layer to crosslink with the material of the inner layer by effectively reducing the concentration of uncrosslinked material available for crosslinking with the outer layer at the site of the mask. Specifically, in such embodiments, the mask reduces/eliminates the contact between the uncrosslinked material of the inner layer and the inner surface of the outer layer. In another embodiment, portions of the uncrosslinked polymer material along the outer surface of the inner layer are removed (e.g., through laser ablation), and thereby effectively reduces the concentration of uncrosslinked material available for crosslinking with the outer layer at the removal site.

In contrast to some prior designs for forming flexible ribbons (e.g., through formation of discrete polymer bridges between individual optical fibers or optical fiber subunits), the design described herein is capable of manufacture using high speed processes such as ink jet printing or laser ablation. Further, the formation of patterns of high/low concentrations of uncrosslinked material discussed herein allows for high levels of control over the level and position of flexibility within a ribbon body that is believed to be superior to prior flexible ribbon designs, including flexible ribbon designs that utilize discrete polymer bridges for improved flexibility.

Referring to FIGS. 1-4, an optical ribbon, such as optical fiber ribbon 10, is shown according to an exemplary embodiment. Ribbon 10 includes an outer polymer layer or outer ribbon body, shown as outer ribbon body 12, and also includes an array 14 of a plurality of optical transmission elements, shown as optical fibers 16. Optical fibers 16 are surrounded by and embedded in the material of outer ribbon body 12, such that ribbon body 12 is coupled to and supports optical fibers 16.

In the embodiment shown, array 14 is a parallel array of optical fibers in which the longitudinal axes of each optical fiber 16 (the axis of each optical fiber 16 perpendicular to the lateral cross-sections shown in FIGS. 3 and 4) are substantially parallel to each other. In other embodiments, the optical fibers may be arranged in non-parallel arrays within ribbon body 12 (e.g., two by two arrays, staggered arrays, etc.).

In the embodiment shown, ribbon 10 includes a single linear array 14 of optical fibers 16. In some other embodiments, ribbon 10 includes multiple arrays 14 of optical fibers 16. In some embodiments, ribbon 10 includes at least two linear arrays 14. In some other embodiments, ribbon 10 includes at least four linear arrays 14. In still other embodiments, ribbon 10 includes at least eight linear arrays 14. In yet still other embodiments, ribbon 10 includes at least 16 linear arrays 14. In some embodiments, each linear array 14 of ribbon 10 has at least two optical fibers 16. In some other embodiments, each linear array 14 of ribbon 10 has at least four optical fibers 16. In still other embodiments, each linear array 14 of ribbon 10 has at least 8 optical fibers 16. In yet still other embodiments, each linear array 14 of ribbon 10 has at least 12 optical fibers 16. In embodiments shown, each optical fiber 16 is separately and individually supported within the ribbon structure. In other embodiments, optical fibers 16 may be grouped into the subunits by an inner subunit layer surrounding and supporting a subset of optical fibers 16 of ribbon 10.

In the embodiment shown, each optical fiber 16 in array 14 is the same as the other optical fibers 16. As will be generally understood and as shown in FIGS. 3 and 4, optical fibers 16 include an optical core 18, surrounded by a cladding layer 20. In various embodiments, optical fibers 16 also each include a coating layer 22. Optical core 18 is formed from a material that transmits light, and optical core 18 is surrounded by a cladding layer 20 that has a different refractive index (e.g., a lower refractive index) than the optical core 18, such that optical fiber 16 acts as a waveguide that retains a light signal within optical core 18.

Coating layer 22 surrounds both optical core 18 and cladding layer 20. In particular embodiments, coating layer 22 is bonded to the outer surface of cladding layer 20, and the outer surface of coating layer 22 defines the outer surface of each optical fiber 16. In general, coating layer 22 is a layer of one or more polymer materials (e.g., UV curable polymer materials) formed from a material that provides protection (e.g., protection from scratches, chips, etc.) to optical fibers 16. In one embodiment, the diameter of optical fiber 16 measured at the outer surface of coating layer 22 is about 250 μm. In various embodiments, each optical fiber 16 may also include an ink layer, a stripe, etc. providing a color-based indication for fiber identification.

Referring back to FIGS. 1 and 2, ribbon 10 includes an inner polymer layer 24 that has an outer surface 26. In various embodiments, inner layer 24 is formed, at least in part, from a polymer material, such as a UV curable polymer material (e.g., UV curable acrylate material), that has been cured via application of UV light to the material following application around fibers 16. In one embodiment, as shown in FIGS. 3 and 4, inner layer 24 is formed from the polymer coating layers 22 of each optical fiber 16. In other embodiments, inner layer 24 may be a contiguous separate polymer ribbon layer surrounding the fiber coating layers 22 of all optical fibers 16 or subsets of optical fibers 16 and located between coating layers 22 and outer ribbon body 12.

In various embodiments, various materials may be used to form inner layer 24 and outer ribbon body 12. In general, both inner layer 24 and outer ribbon body 12 are formed UV curable polymer materials, and in more specific embodiments, both inner layer 24 and outer ribbon body 12 are formed UV curable acrylate polymer materials. In one specific embodiment, inner layer 24 is the KG400 optical fiber coating polymer available from PhiChem Corporation, and outer ribbon body 12 is formed from the BondShield polymer material available from Hexion Inc. In another specific embodiment, inner layer 24 is the AngstromBond, DSM 950-706 optical fiber coating polymer available from Fiber Optic Center, Inc. and outer ribbon body 12 is formed from the BondShield polymer material available from Hexion Inc.

In other embodiments, as noted herein, inner layer 24 includes one or more outer polymer layer of each optical fiber 16 (e.g., such as outer coating 22 and any associated ink layers). In some such embodiments, outer coating layer 22 and/or the associated ink layers are UV curable polymer materials, and specifically may be UV curable acrylate materials around each optical fiber. In various embodiments, outer surface 26 of inner layer 24 is formed (in whole or in part) from a UV curable acrylate ink material located on the outer surface of each optical fiber 16 providing color-based identification, and in a specific embodiment, the UV curable acrylate ink material of optical fiber 16 is the FibreCoat UV-curing ink available from Farbwerke Herkula SA/AG. In other embodiments, inner layer 24 and/or outer ribbon body 12 may be made from other suitable polymer materials, including thermoplastic materials.

In general, the UV curable polymer material of inner layer 24 (whether a separate inner ribbon layer or formed from the coating layers 22 of optical fibers 16) is cured in the presence of oxygen, which inhibits polymerization of the UV curable polymer. This oxygen inhibition of polymerization creates a thin layer (e.g., a layer of less than 1 μm, or less than 2 μm) of uncrosslinked polymer material along the outer surface of the UV curable polymer material of inner layer 24. In general, a UV curable material of outer ribbon body 12 will have a high degree of bonding caused by crosslinking with the uncrosslinked polymer material of inner layer 24 during UV cure of the material of outer ribbon body 12.

To control the degree and position of bonding between inner layer 24 and outer ribbon body 12, inner layer outer surface 26 is modified to create regions having a high concentration of uncrosslinked polymer material and regions having no or low concentration of uncrosslinked polymer. Thus, because the inner surface of ribbon body 12 interfaces with the differing uncrosslinked material concentrations along surface 26, the degree of bonding between ribbon body 12 and outer layer 26 of inner layer 24 can be controlled. In specific embodiments, this degree of bonding is controlled to provide ribbon 10 with a degree of controlled decoupling allowing individual fibers/subunits to move relative to one another and thus allow a level of flexibility allowing ribbon 10 to assume configurations other than the planar fiber configuration shown in FIG. 1, such as rolled configurations, stacked, collapsed or bundled configurations, etc.

Figure 2:
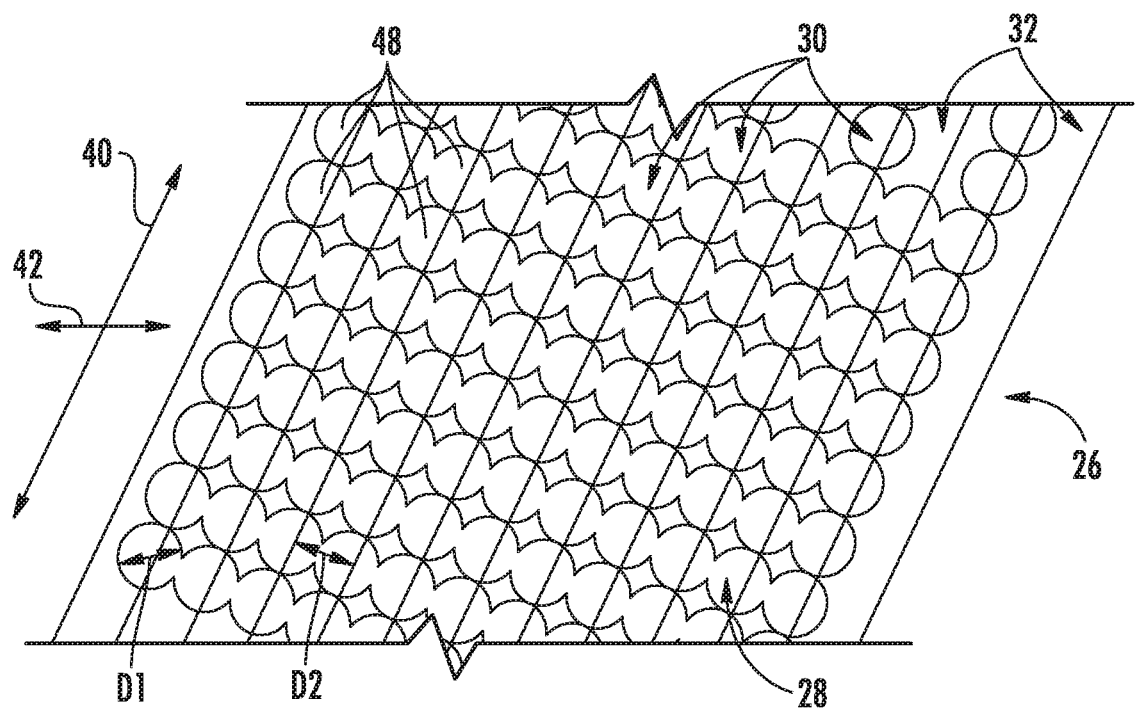
FIG. 2 shows a detailed view of a masked surface of an inner ribbon layer, according to an exemplary embodiment.
Figure 3A:
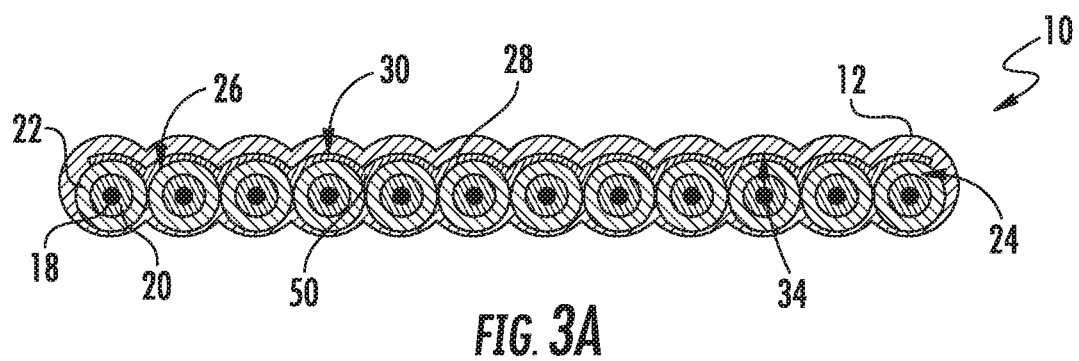
FIGS. 3A and 3B show cross-sectional views of the optical fiber ribbon of FIG. 1 taken along the line 3-3 showing different masking patterns, according to exemplary embodiments.
Figure 3B:
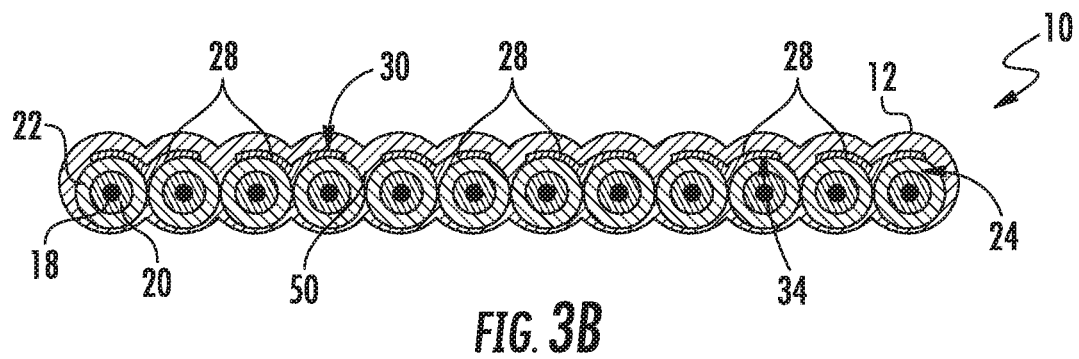

Referring to FIGS. 1 and 2, in one embodiment, the areas of low uncrosslinked material concentration are formed via application of a mask 28 in an array or pattern on top of the UV curable material of inner layer 24. In specific embodiments, mask 28 is formed from a material that is different from the UV curable polymer material of inner layer 24, and as shown best in FIGS. 3A and 3B, the material of mask 28 acts to block interaction between the inner surface 34 of ribbon body 12 and the UV curable material of inner layer 24. Thus, in such an embodiment, outer surface 26 of inner layer 24 is formed in part by the outer surfaces 30 of mask 28 which as a low or zero concentration of uncrosslinked polymer material by covering a portion of the oxygen inhibited layer. This, in turn, results in regions having a low level of bonding between outer ribbon body 12 and outer surface 26 of inner layer 24. In various embodiments, as shown in FIG. 3A, mask 28 has zones that are contiguous across substantial portions of the width of ribbon 10, and in other embodiments, mask 28 forms a discontinuous pattern in sections/dots across ribbon 10. As shown in FIG. 3B, mask 28 may be formed from discrete dots or sections of mask material touching fibers 1 and 2, fibers 3 and 4, fibers 5 and 6, etc.

In addition, outer surface 26 of inner layer 24 is also formed in part by exposed areas 32 of uncrosslinked polymer material. These areas are not covered or blocked by mask 28. Thus, as shown best in FIGS. 4A and 4B, at exposed areas 32, inner surface 34 of outer ribbon body 12 directly interfaces or contacts portions of outer surface 26 having a high concentration of uncrosslinked polymer material. Thus, then during UV curing of UV curable material of outer ribbon body 12, crosslinks are formed between the UV curable of inner layer 24 and the UV curable material of outer ribbon body 12 forming areas with high degrees of bonding between the two layers.

Referring to FIGS. 1 and 2, mask 28 is shown and described in more detail. In the embodiment shown, mask 28 is applied in a selected, consistent or repeating pattern or array, such that outer surface 26 has a repeating pattern or array of areas of low uncrosslinked material concentration and areas of high uncrosslinked material concentration. In particular embodiments, this pattern repeats in the lengthwise direction, shown by arrow 40, and/or in the widthwise direction, shown by arrow 42. As shown in FIG. 1, in a particular embodiment, areas of dense masking 44 and areas of less dense or no masking 46 alternate along the length of ribbon 10.

In specific embodiments, mask 28 is formed from a material applied utilizing a printing technique, such as inkjet printing, and in such embodiments, the material of mask 28 is an ink material. In such embodiments, mask 28 may be formed from a dye-based ink and/or a pigment-based ink. It is believed that use of a printing technique to form mask 28, such as inkjet printing, allows for formation of flexible ribbon 10 at high speeds (as compared to methods that utilize discrete bridge formation to provide ribbon flexibility).

In various embodiments, the pattern of mask 28 (and the resulting pattern of high and low uncrosslinked material concentrations available for subsequent crosslinking) is designed or selected to control one or more property, such as flexibility, of ribbon 10. Referring to FIG. 2, mask 28 is formed from a plurality of dots 48. In the embodiment shown, dots 48 overlap each other forming a continuous layer of masking material, and in at least some embodiments, the overlapped portions of dots 48 ensure that the mask material is sufficiently thick at those portions to limit or prevent bonding as discussed herein. In other embodiments, dots 48 are discrete dots separated from each other by intervening areas of unmasked, high uncrosslinked material areas. In a specific embodiment, dots 48 are centered on the interface or groove formed between each adjacent optical fiber 16 (or each adjacent fiber subunit in the case of multi-fiber subunits). Each dot 48 has a diameter shown as D1 and center-to-center spacing shown as D2. In specific embodiments, D1 is between 0.1 mm and 0.4 mm, and D2 is between 50% and 150% of D1. It should be noted that the inherent exposed portions of a mask created with a series of overlapping dots will create bonding between the dot layers, and in such embodiments, the materials of the dots will cohesively fail at these small bonded regions.

Figure 4A:
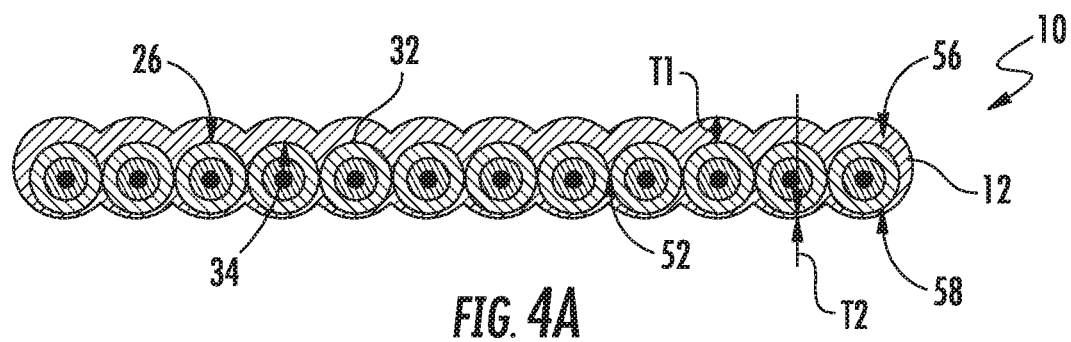
FIG. 4A shows a cross-sectional view of the optical fiber ribbon of FIG. 1 taken along the line 4-4, according to an exemplary embodiment.

Referring to FIGS. 3 and 4, in addition to controlling flexibility through the degree and positioning of bonding between inner layer 24 and ribbon body 12, the degree of bonding between adjacent optical fibers 16 may also be controlled utilizing the designs discussed herein. For example, as shown in FIGS. 3A and 3B, mask 28 may extend at least part of the distance into the area 50 between adjacent fibers 16. This limits the ability of the uncrosslinked polymer materials of coating layer 22 from crosslinking together at the site of mask filled area 50 during subsequent UV cure steps. In contrast, as shown in FIG. 4A, within the unmasked areas 52 between adjacent fibers 16, crosslinks between previously uncrosslinked materials may be formed within areas 52 during subsequent UV cure steps bonding together adjacent optical fibers 16 at those positions.

Referring to FIG. 4A, in addition to controlling flexibility through bonding control, ribbon 10 may also provide flexibility through control of ribbon thickness. In specific embodiments, outer ribbon body 12 may have a first portion, show as upper portion 56, and a second portion, shown as lower portion 58, which have different thicknesses resulting in different degrees of flexibility. In various embodiments upper portion 56 has a first average thickness shown as T1, and lower portion 58 has a second average thickness shown as T2. In the specific embodiment shown, T2 is less than T1, such as less than 50% of T1, more specifically between 1% and 25% of T1, and even more specifically between 1% and 10% of T1.

In some embodiments, portion 58 is thin enough that bonding between inner layer 24 and ribbon body 12 within lower portion 58 cohesively fails without the application of mask 28 to the lower surface of inner layer 24, which facilitates flexibility utilizing mask 28 on only one side of inner layer 24. In specific embodiments, the low thickness of lower portion 58 also provides a portion of ribbon body 12 that may be broken or torn in the event that one or more fibers 16 need to be separated from the rest of ribbon 10. In other embodiments, T1 and T2 may be substantially equal, and in such embodiments, ribbon 10 may include a mask 28 on both the upper and lower surfaces of inner layer 24.

As shown in FIGS. 3A and 3B, in one embodiment, mask 28 is applied on one side of inner layer 24, and is located adjacent the thicker, upper portion 56 of ribbon body 12. In another embodiment, mask 28 is applied to both of the major surfaces of polymer material of inner layer 24 (e.g., upper and lower surfaces in the orientation of 3A and 3B).

Figure 4B:
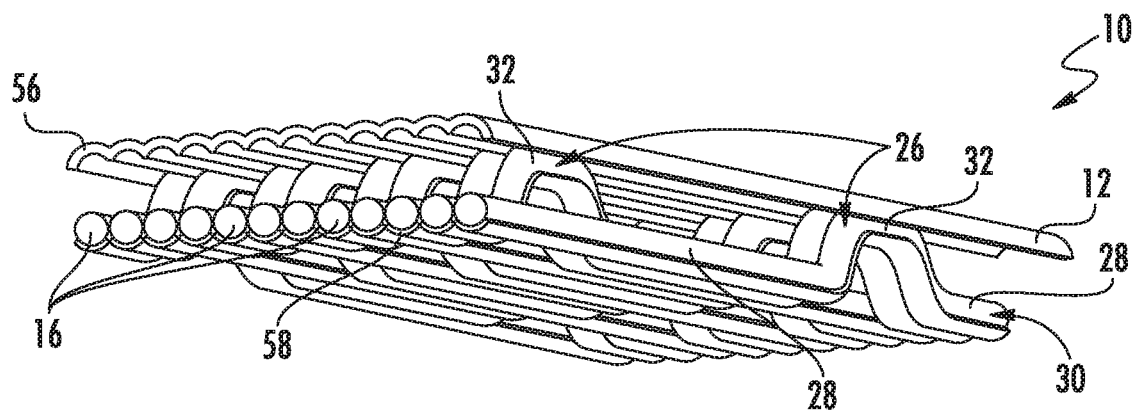
FIG. 4B shows a cut-away perspective view of the optical fiber ribbon of FIG. 1 showing intermittent bonding, according to an exemplary embodiment.

Referring to FIG. 4B, the intermittent bonding within ribbon 10 is shown in more detail. Exposed areas 32 of uncrosslinked polymer material of inner layer 24 are not covered or blocked by mask 28. Thus, at exposed areas 32, the inner surface of outer ribbon body 12 directly interfaces or contacts portions of outer surface 26 having a high concentration of uncrosslinked polymer material, which allows for bonding as discussed herein. Masked areas 28 do not bond to outer ribbon body 12. Also, lower, thinned portion 58 of ribbon body 12 is easily broken which allows for increased flexibility. In the embodiment shown, no mask material is applied between the lower surface of optical fibers 16 and lower, thinned portion 58, which results in a high level of adhesion between these two layers. However, flexibility is provided by the low level of thickness, which allows portion 58 of ribbon body 12 to break when flexed.

Figure 5:
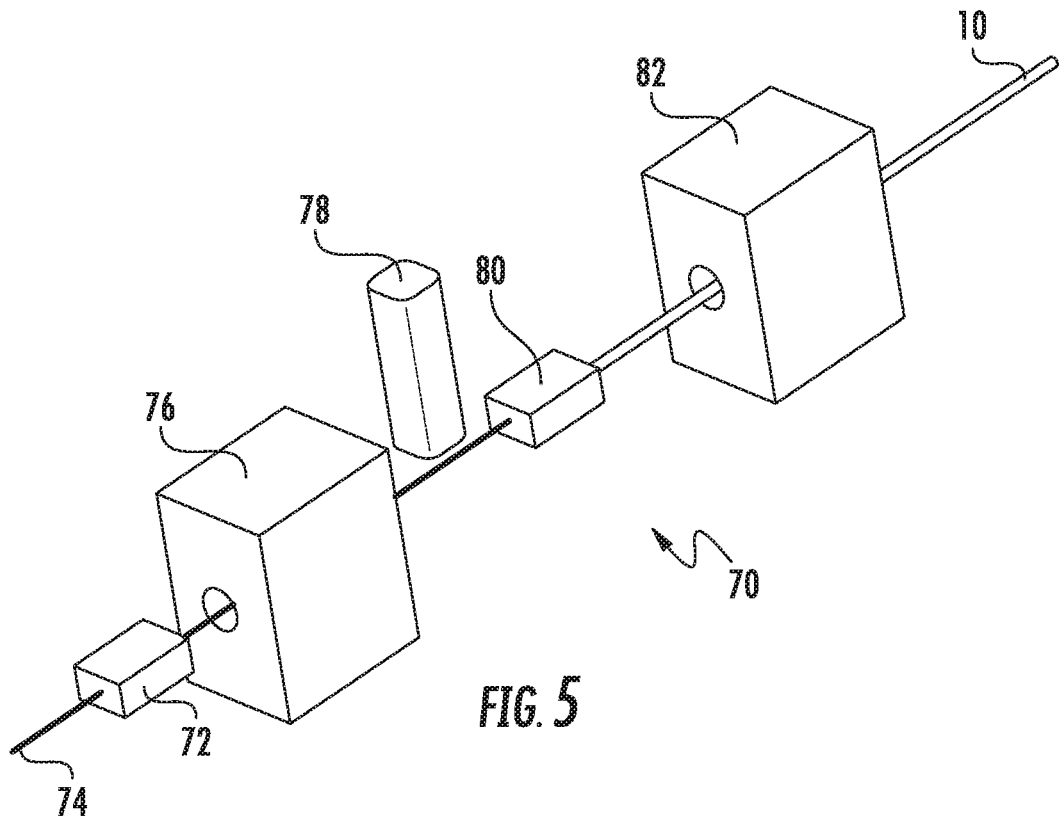
FIG. 5 shows a system and method for forming an optical fiber ribbon, according to an exemplary embodiment.
Figure 6:
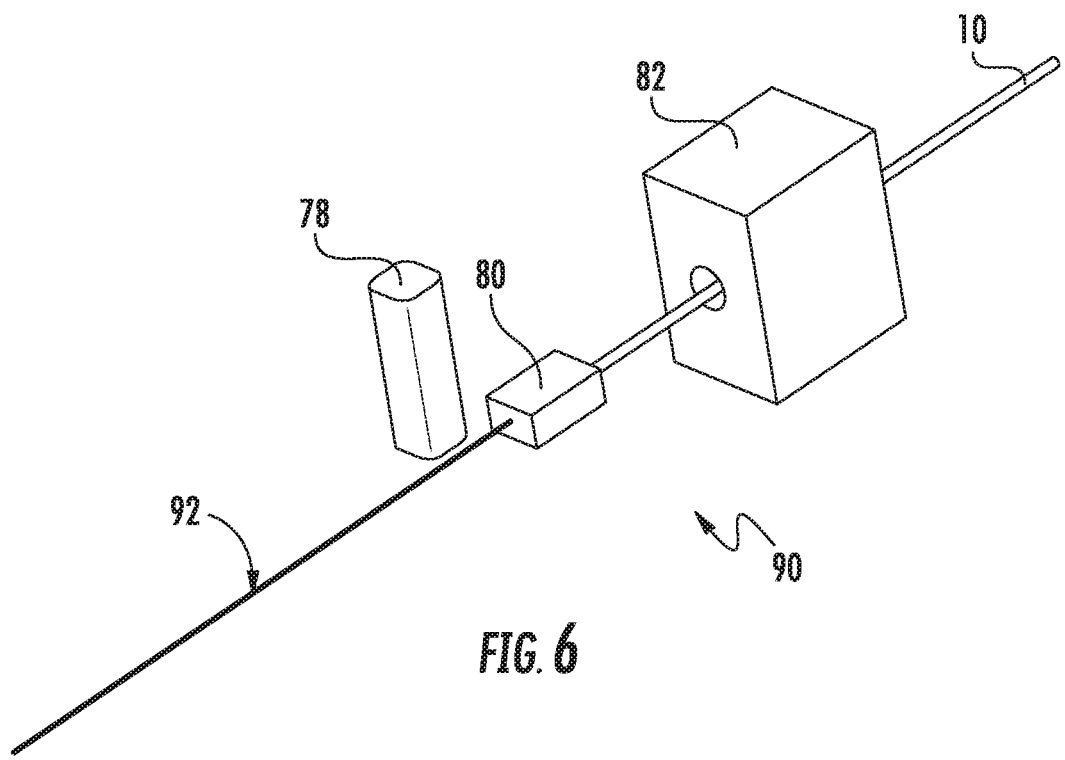
FIG. 6 shows a system and method for forming an optical fiber ribbon, according to another exemplary embodiment.

Referring to FIG. 5 and FIG. 6, systems and methods for forming a flexible ribbon, such as ribbon 10, are shown according to exemplary embodiments. Referring to FIG. 5, a system 70 and related method for forming ribbon 10 is shown. System 70 includes a first applicator 72 that applies a first UV curable polymer material onto a plurality of incoming optical fibers 74. In specific embodiments, the first UV curable polymer material is applied as a liquid containing a UV curable polymer material, and in specific embodiments, is applied using a self-metering coating applicator.

The uncured polymer coated optical fibers move into a first UV curing station 76. Within station 76, a UV lamp directs UV energy onto the first UV curable polymer in the presence of oxygen. As will generally be understood within at least some UV coating/curing process, free radicals are generated when the photo-initiators within the UV curable coating are exposed to UV radiation. The free radicals in turn initiate cross-linking of the monomers and oligomers within the liquid coating causing the material to polymerize. On the outer surface of the liquid UV coating, oxygen from the air in contact with the liquid coating will do two things. The oxygen limits/prevents the creation of free radicals near the air/coating interface, and the oxygen reacts with already created free radicals to form peroxyl radicals that in turn react with the hydrogen within the backbone of the polymer. This reaction creates hydroperoxides. The suppression of free radical creation and the consumption of already created free radicals lowers the polymerization reaction rate and percentage conversion at and near the air/coating interface. The suppression of the reaction at the surface of the liquid coating results in a layer of uncrosslinked polymer material (e.g., uncrosslinked monomers and oligomers) with a depth of up to about 2 µm within the cured polymer coating. Thus, by curing in the presence of oxygen, station 76 forms the cured polymer layer portion of inner layer 24 (shown in FIG. 1) that also includes the outer layer of uncured (e.g., uncrosslinked) polymer materials, as discussed above.

Next, the outer surface of the inner polymer layer is modified. This modification forms modified areas that have levels of uncrosslinked UV curable polymer material that are lower than the levels of uncrosslinked UV curable polymer material present outside of the modified areas. In the embodiment shown in FIG. 5, this modification occurs through the application a mask, such as mask 28, at mask applicator 78. In the embodiment shown, mask applicator 78 is a non-contact applicator, such as an inkjet printer, that applies a masking material onto the outer surface of UV polymer material cured in station 76. In other embodiments, mask applicator 78 may be a liquid dispensing nozzle applicator or an ink transfer drum. As noted above, the mask is applied by mask applicator 78 in the desired pattern (such as the repeating pattern shown in FIG. 1 and discussed above) such that it provides a pattern of high and low concentrations uncrosslinked polymer materials exposed to and available for crosslinking/bonding with subsequently applied layers of UV curable polymer materials.

Following mask application, a second UV curable polymer material is applied at a second applicator 80. At applicator 80, the second UV curable polymer material is applied over the outer surface of the inner layer (e.g., inner layer 24) and in contact with both the mask material and exposed portions of oxygen inhibited, uncured material. In this arrangement, the second UV curable polymer is applied so that the material both surrounds the optical fiber and is continuous along the length of the optical fibers.

Next, the second UV curable polymer is cured around the optical fibers within second UV curing station 82. Within station 82, a UV lamp directs UV energy to the second UV curable polymer cured polymer layer (e.g., outer ribbon body 12 discussed above) is formed surrounding both the inner UV curable polymer layer and the optical fibers. Through the process of UV curing the second UV curable polymer material while part is in contact with the mask and part is contact with the uncrosslinked material zones, regions of low and high levels of bonding are formed as discussed above, and ribbon 10 exits system 70. In one embodiment, station 82 cures ribbon body 12 without the presence of oxygen such that a fully cured ribbon body is formed, and in another embodiment, station 82 cures ribbon body 12 in the presence of oxygen such that a ribbon body 12 having a tacky or uncrosslinked surface is formed.

In particular embodiments, it is believed that mask application process can run at speeds substantially faster the processes that provide ribbon flexibility through discrete bridge formation. In specific embodiments, system 70 is believed to produce ribbon 10 at speeds up to 450 meters/minute. In addition, in contrast to physical tooling used to form discrete bridges, system 70 can form different mask patterns simply through programming mask applicator 78 to apply a different pattern, without the need to change physical tooling. This flexibility allows the cable manufacturer to more easily construct and evaluate the flexibility provided by different masking patterns and also allows system 70 to be used to form different ribbons with different masking patterns/flexibility simply through computer control of mask applicator 78. As explained in more detail below regarding FIGS. 7 and 8, the pattern of high and low concentrations of uncrosslinked material may also be created through a removal process such as laser ablation, and it is believed that laser ablation also has high throughput speeds and pattern formation flexibility similar to that of mask applicator 78.

Referring to FIG. 6, a system 90 and related method for forming ribbon 10 is shown. System 90 is substantially the same as system 70, except that previously oxygen inhibited coated optical fibers 92 are provided to system 90. Then mask applicator 78 applies the masking material, and stations 80 and 82 apply and cure the material for the outer ribbon body as discussed above regarding system 70. Thus, system 90 provides the outer polymer layer to already coated fibers rather than coating fibers in line with the masking and second coating process as in system 70.

Figure 7:
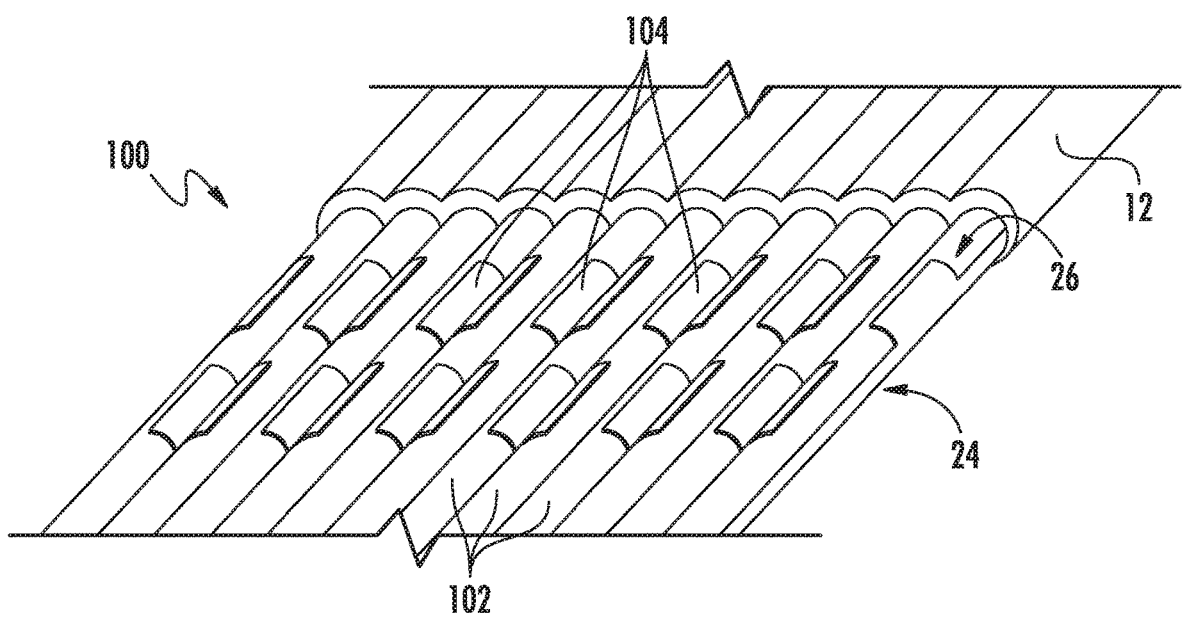
FIG. 7 shows a cut-away, perspective view of a flexible optical fiber ribbon, according to another exemplary embodiment.
Figure 8:
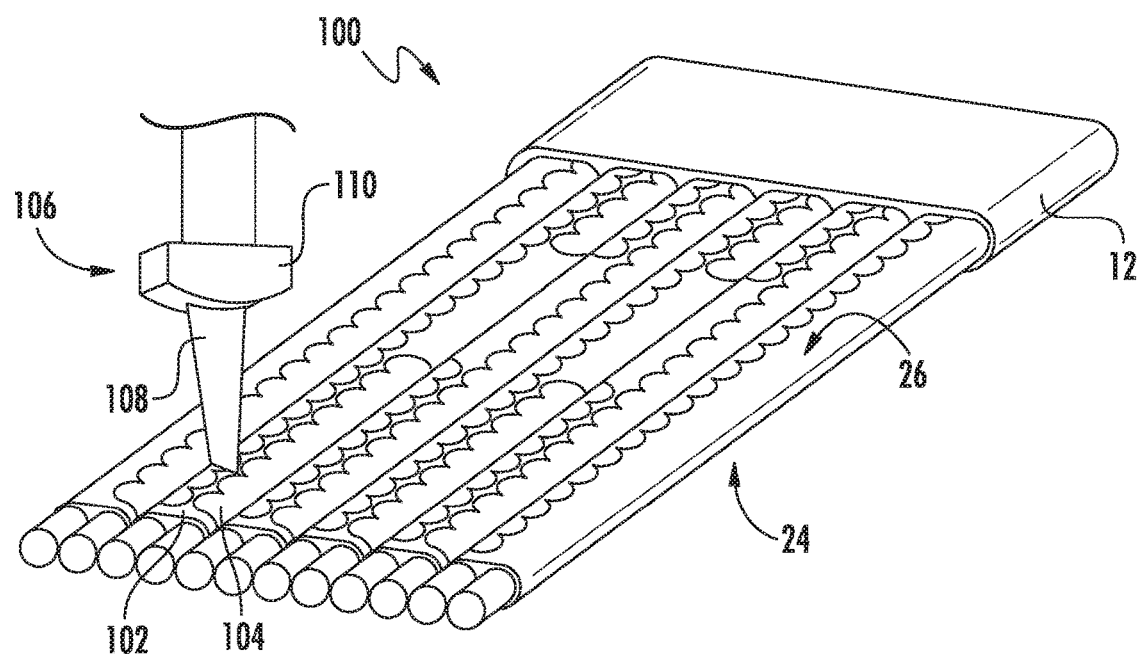
FIG. 8 shows a system and method for forming an optical fiber ribbon, according to another exemplary embodiment.

Referring to FIGS. 7 and 8, ribbon 100 is shown according to an exemplary embodiment. Ribbon 100 is substantially the same as ribbon 10 except as discussed herein. Ribbon 100 includes an inner layer 24 that includes outer surface 26 that has a repeating pattern or array of areas of low uncrosslinked material concentration, shown as areas 102, and areas of high uncrosslinked material concentration, shown as areas 104. In this embodiment, areas 102 are formed by removing at least a portion of the oxygen cure inhibited layer of polymer following curing in station 76 in a pattern which results in the pattern of areas 102 and 104 as shown in FIG. 7.

In some embodiments, within each area 102 the entire thickness of the oxygen inhibited, uncrosslinked material zone is removed, which results in very low or no bonding to outer ribbon body 12 following the second curing step. In some such embodiments, the thickness of uncrosslinked material removed is 2 µm or less, such that areas 102 form depressions that are 2 µm or less, on average, below the outer surfaces of the adjacent unmodified areas 104. Similar to mask 28, areas 102 are formed in the desired repeating pattern to provide the desired level of bonding with outer ribbon body 12.

In various embodiments, areas 102 may be formed by removal of sections of uncrosslinked polymer material following oxygen inhibited UV curing (such as in station 76 shown in FIG. 5) using a variety of suitable removal processes. In a particular embodiment, as shown in FIG. 8, areas 102 may be formed via removal utilizing a laser ablation system 106. As will be understood, laser ablation system 106 generates a laser beam 108 which is directed toward inner layer 24 which removes portions of the oxygen inhibited uncrosslinked polymer material to form areas 102 by exposing the fully cured/crosslinked polymer material just below the layer of uncrosslinked material. In specific embodiments, laser ablation system 106 may be used instead of or in addition to masking system 78 in systems 70 or 90 to form the pattern of high and low concentrations of uncrosslinked material as discussed above.

Laser ablation system 106 may be configured to remove material from inner layer 24 by either thermo-mechanical or photochemical mechanisms. In specific embodiments, laser ablation system 106 utilize short pulse lasers such as nanosecond UV or visible wavelength lasers which Applicant believes are suitable for removing very low thickness layers of polymer material. Because the diameter of coated optical fibers 16 is relatively small (~250 µm), the amplitude of the surface undulation of the ribbon fiber is relatively small, on the order of tens of microns. Thus, in specific embodiments, laser ablation system 106 may utilize an optical design having a focus that accommodates this relatively small amount of surface variation along the surface 26 of inner layer 24. In specific embodiments, focus of laser system 106 may be accomplished through an optical system 110 that includes one or more cylindrical lens and/or one or more plano-convex lens or other suitable laser focusing components.

While the above description focuses on masking and removal to create the pattern of high and low concentrations of uncrosslinked material which forms the differential levels of bonding discussed above, in other embodiments, other systems or methods for varying the bond level between inner and outer ribbon layers and/or between adjacent fiber coating layers may be used. For example, in one embodiment, the pattern of high and low concentrations of uncrosslinked material may be formed by controlling exposure of different portions of the UV curable material of inner layer 24 to the UV curing energy source (e.g., through control of a UV energy intensity pattern during curing). In another exemplary embodiment, the pattern of high and low concentrations of uncrosslinked material may be formed by controlling exposure of different portions of the UV curable material of inner layer 24 to different levels of oxygen during UV curing.

It should be understood that the optical ribbons discussed herein can include various numbers of optical fibers 16. In various exemplary embodiments, the optical ribbons discussed herein may include 2, 4, 6, 8, 10, 12, 14, 16, 24, 30, 34, 40, etc. optical fibers or transmission elements (e.g., optical fibers 16). While the ribbon embodiments discussed herein are shown having optical fibers 16 arranged in a substantially parallel, linear array, optical fibers 16 may be arranged in a square array, rectangular array, a staggered array, or any other spatial pattern that may be desirable for a particular application. In various embodiments, optical fibers 16 can include a wide variety of optical fibers including multi-mode fibers, single mode fibers, bend insensitive/resistant fibers, etc. In other embodiments, the optical ribbons discussed herein may include a multi-core optical fiber located within ribbon body 12.

The optical fibers discussed herein may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber. In addition, these coatings may also include an outermost layer of ink or color for fiber identification.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A flexible optical fiber ribbon comprising:
a plurality of elongate optical fibers;
an inner polymer coating layer surrounding the plurality of optical fibers, the inner polymer coating layer having an inner surface facing the optical fibers and an outer surface opposite the inner surface;
an outer ribbon body surrounding the inner polymer coating layer, the outer ribbon body having an inner surface facing the outer surface of the inner polymer coating layer, the inner surface of the outer ribbon body comprising:
a plurality of first regions each having a first level of bonding to the outer surface of the inner polymer coating layer; and
a plurality of second regions each having a second level of bonding to the outer surface of the inner polymer coating layer;
wherein the first levels of bonding are greater than the second levels of bonding.

2. The flexible optical fiber ribbon of claim 1, wherein the inner polymer coating layer is formed from UV curable polymer material, wherein the plurality of first regions interface with first areas of the outer surface of the inner polymer coating layer that have first concentrations of uncrosslinked UV curable polymer material, wherein the plurality of second regions interface with second areas of the outer surface of the inner polymer coating layer that have second concentrations of uncrosslinked UV curable polymer material, wherein the first concentrations are greater than the second concentrations.

3. The flexible optical fiber ribbon of claim 2, wherein the second areas of the outer surfaces of the inner polymer coating layer are formed from a masking material located between the UV curable polymer material of the inner polymer coating layer and the inner surface of the outer ribbon body, wherein outer surfaces of the masking material define a portion of the outer surface of the inner polymer coating layer at the location of the masking material, wherein the masking material is a material different from the UV curable polymer material of the inner polymer coating layer.

4. The flexible optical fiber of claim 3, wherein the masking material is an array of dots of the masking material located on the UV curable polymer material of the inner polymer coating layer, wherein at least some of the dots are positioned such that a dot is located at an interface between an adjacent pair of the optical fibers.

5. The flexible optical fiber of claim 2, wherein the second areas of the outer surfaces of the inner polymer coating layer include depressions formed in the UV curable polymer material of the inner polymer coating layer where uncrosslinked UV curable polymer material of the inner polymer coating has been removed.

6. The flexible optical fiber of claim 2, wherein the UV curable polymer material is an acrylate polymer material, and the outer ribbon body is formed from a UV curable polymer material that is different from the UV curable polymer material of the inner polymer coating layer.

7. The flexible optical fiber of claim 2, wherein the inner polymer coating layer comprises a plurality of outer, primary fiber coating layers surrounding glass fiber optic cores of the optical fibers.

* * * * *